Patented Jan. 5, 1943

2,307,494

UNITED STATES PATENT OFFICE 2,307,494

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application July 7, 1941,
Serial No. 401,382

4 Claims. (Cl. 252—340)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The composition of matter herein described, which is used as the demulsifying agent of our process, is obtained by the oxyalkylation of blown or oxidized castor oil to a point definitely short of water solubility.

It is well-known that oxidized oils can be obtained from castor oil ricinoleic acid and various derivatives of ricinoleic acid, such as: Monoricinolein, diricinolein and polyricinoleic acids. They are produced by the common practice of blowing or oxidizing castor oil and similar fatty oils or acids, particularly non-drying unsaturated fatty oils, by means of a gaseous medium, such as air, oxygen, ozone, or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc.; or it may be of the organic type which produces peroxide such as alpha pinene, linseed oil, etc. Oxidation may take place at atmospheric pressure or super-atmospheric pressure, i. e., pressures up to or including 200 pounds gauge pressure, and at any temperature slightly above the boiling point of water, for instance, 120° C., up to any temperature which does not produce undue decomposition by pyrolytic reaction.

The time of blowing may be fairly brief, for example, 8–10 hours; or it may be quite extensive, for instance, as long as 10–12–14 days, the longer time periods being employed generally when the temperature is just slightly above the boiling point of water and when oxidation is with air at atmospheric pressure.

Mild oxidation, i. e., oxidation as exemplified by the exposure of a film of castor oil to air, for an extended period of time, such as weeks or even months (see Chemical Technology and Analysis of Oils, Fats, and Waxes, By Lewkowitsch, sixth edition, volume 2, page 406) produces relatively small modifications of certain important indices, such as the iodine value, the acetyl value, and the saponification value. If drastic oxidation takes place, either by continued mild oxidation, or by more vigorous oxidation from the very beginning of the reaction, as induced by either a higher reaction temperature or the presence of a catalyst, then there is obtained an oxidized oil having characteristics which clearly indicate that drastic oxidation has taken place. These indices of drastic oxidation are a relatively low iodine value, such as 70 or less, and may be as low as 40, or thereabouts; a saponification value of 215 to 283, or thereabouts; an acetyl value of approximately 160–200; an increased viscosity such that the material may be hardly mobile at ordinary temperatures; a specific gravity of almost one, or a trifle over one at times; an increased refractive index; and, in the absence of other coloring matter, a yellow to deep orange color. The color at times may be a questionable index, since some oxidized castor oils are bleached to make them particularly adaptable for use as plasticizers in light colored resinoid bodies.

Drastically oxidized castor oil can be prepared by well known methods, or such products can be purchased in the open market under various trade names, such as "blown castor oil," "blended castor oil," "blended bodied castor oil," "processed castor oil," "oxidized castor oil," "heavy castor oil," "viscous castor oil," etc. These various trade names appear to be applied to drastically oxidized castor oils which differ merely in degree but not in kind.

The color of these oils is still pale or light colored in comparison with the oil from which they have been derived. Usually they are fairly transparent, particularly in reasonably thin layers, for instance, an inch or less. Such oils represent greater or lesser degrees of partial oxidation in the sense that there is a drastic change in comparison with the change that takes place when a film of castor oil is exposed to air.

For the sake of differentiation, oils of the kind previously described will be referred to as pale blown, drastically oxidized castor oils; and the same terminology is intended to apply to all other ricinoleic bodies of the kind hereinafter described. In addition to pale blown, drastically oxidized castor oil, there is also another type of the kind described in U. S. Patent No. 2,023,979, to Stehr, December 10, 1935. The product described in said Stehr patent is characterized by the fact that drastic oxidation is continued past the stage where a pale blown oil is obtained and where, as a matter of fact, a super oxidized product of almost semi-livery consistency is obtained.

Such products are usually much darker in color than the pale blown castor oils, for the reason that certain side reactions occur with the formation of dark colored by-products; and as a result, the transparency of the oil has greatly decreased or disappeared, and it is apt to be opaque in nature.

Attention is directed particularly to U. S. Patent No. 2,183,487, dated December 12, 1939, to Colbeth, to the extent that it discloses details as to the oxidation of castor oil in a manner that is particularly desirable.

Our preference is to subject a pale blown castor oil of the following characteristics, to oxyalkylation, particularly oxyethylation:

| | |
|---|---|
| Acid number | 15.1 to 25.0 |
| Saponification number | 230.5 to 274.0 |
| Iodine number | 43.5 to 55.0 |
| Acetyl number | 164.0 to 192.0 |
| Hydroxyl number | 188.0 to 220.0 |
| Percent unsaponifiable matter | 1.1 |
| Percent nitrogen | 0.0 |
| Percent $SO_3$ | 0.0 |
| Percent ash | Trace |

It is well known that if triricinolein, preferably in the form of castor oil, is treated with an oxyalkylating agent, particularly ethylene oxide, propylene oxide, butylene oxide, glycidol, or the like, and if one employs a large molecular proportion of the oxyalkylating agent for each mole or occurrence of the ricinoleyl radical, that one can convert castor oil into a water-soluble product. The conventional procedure is well known, and generally speaking, involves nothing more or less than heating castor oil in the presence of successive small amounts of alkylene oxide or the like, under comparatively low pressures and fairly low temperatures, and usually in the presence of an alkylene catalyst, as, for example, sodium ricinoleate. The temperatures employed are generally above 100° C. and below 200° C. The pressures employed are generally above 100 lbs. gauge and below 300 lbs. gauge pressure. Sometimes oxyalkylation is conducted in a continuous manner by introduction of the ethylene oxide in a gaseous state. More frequently, and most conveniently, the oxide is introduced in a liquid form in a comparatively small amount, for instance, 300 pounds of castor oil and 30 pounds of ethylene oxide, along with approximately one pound of sodium ricinoleate. Reaction is allowed to take place under pressure in the manner above described until all the ethylene oxide is absorbed. Another portion of ethylene oxide is added, and the procedure repeated until water solubility is obtained. Not infrequently as many as 30 pound moles of the oxyalkylating agent are employed for one pound mole of triricinolein, in order to obtain complete water solubility. Needless to say, ethylene oxide promotes solubility in lower molecular proportions than propylene oxide or butylene oxide. Furthermore, ethylene oxide is preferable, due to its greater reactivity.

We have found that if one oxyalkylates blown or oxidized castor oil with any of the usual oxyalkylating agents indicated, particularly ethylene oxide, to a point short of water solubility, one obtains a product which has particular merit as a demulsifier.

In the manufacture of such oxyalkylated blown castor oils we prefer, for the sake of convenience, to consider the molecular weight of the blown castor oil the same as if it were unmodified triricinolein. This is not strictly correct, but it is convenient, thus subsequent reference to one pound mole of blown castor oil is intended to mean 944 pounds. Our preference is to treat one pound mole of castor oil with approximately three, six or nine moles of ethyl oxide. Drastic oxyethylation may introduce as many as 18 or 20 moles of ethylene oxide, without yielding a water-soluble product. In the event propylene oxide or butylene oxide is employed, a greater moto ratio of the alkylene oxide can be employed, but greater difficulty is incurred, because such reactants combine less readily than ethylene oxide. It is to be noted that we are concerned with oxyalkylation to a degree short of water solubility.

*Composition of matter—Example 1*

One pound mole of pale blown castor oil of the kind described by the above table is reacted with three pound moles of ethylene oxide, in the presence of ½ of 1% of sodium stearate as a catalyst.

*Composition of matter—Example 2*

Same procedure is followed as in Example 1, preceding, except that 6 pound moles of ethylene oxide are employed.

*Composition of matter—Example 3*

Same procedure is followed as in Example 1, preceding, except that 9 pound moles of ethylene oxide are employed.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents, provided that such compounds are compatible. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Having described our invention, what we claim as new and desire to secure by Letters Patent is:

1. A process for breaking petroleum emulsions of the water-in-oil type, characterized by subjecting the emulsion to the action of a demulsifying agent comprising a water-insoluble oxyalkylated drastically oxidized castor oil.

2. A process for breaking petroleum emulsions of the water-in-oil type, characterized by subjecting the emulsion to the action of a demulsifying agent comprising a water-insoluble oxyethylated drastically oxidized castor oil.

3. A process for breaking petroleum emulsions of the water-in-oil type, characterized by subjecting the emulsion to the action of a demulsifying agent comprising a water-insoluble oxyethylated drastically oxidized castor oil of the pale blown type.

4. A process for breaking petroleum emulsions of the water-in-oil type, characterized by subjecting the emulsion to the action of a demulsifying agent comprising a water-insoluble oxyethylated drastically oxidized castor oil of the pale blown type; the oxyalkylation of said castor oil involving at least three and not more than nine moles of ethylene oxide for each mole of triricinolein employed prior to oxidation.

MELVIN DE GROOTE.
BERNHARD KEISER.